Feb. 3, 1931. S. C. HATFIELD 1,791,128
RESILIENT DISK WHEEL
Filed June 29, 1922  2 Sheets-Sheet 2
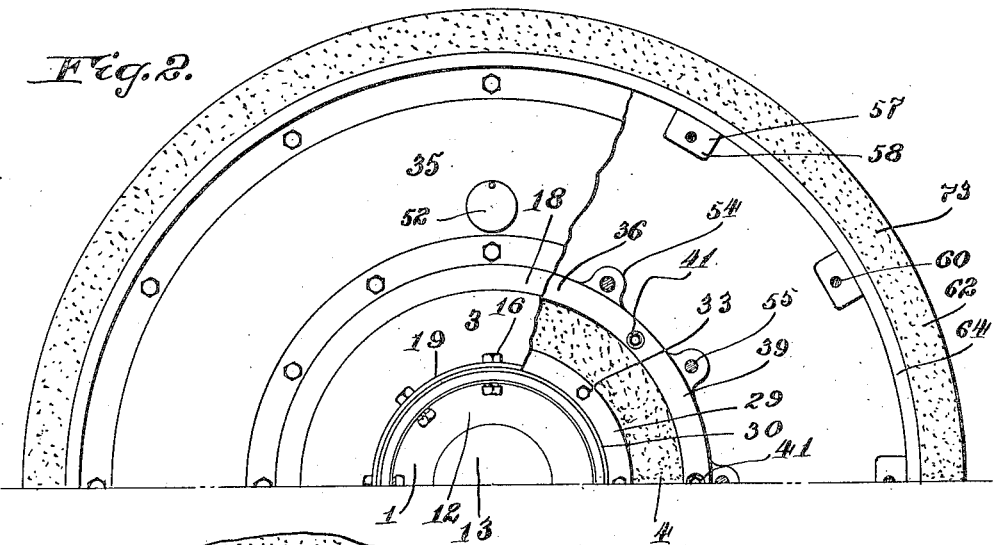
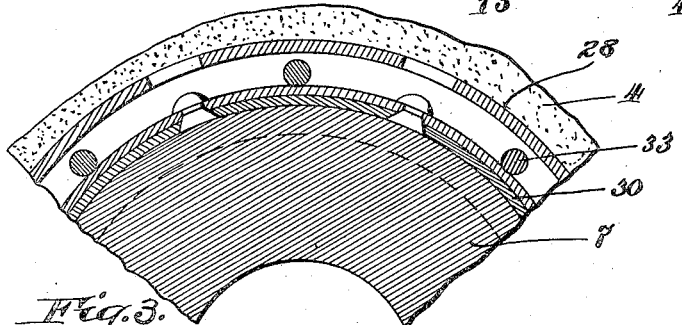
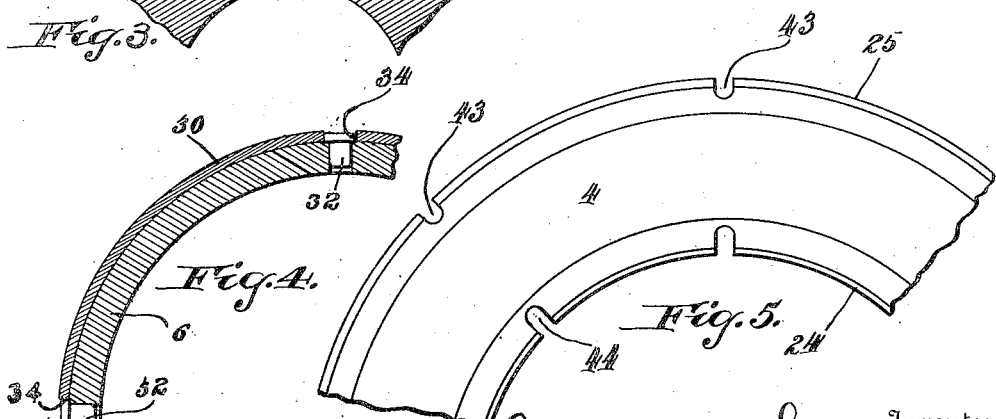

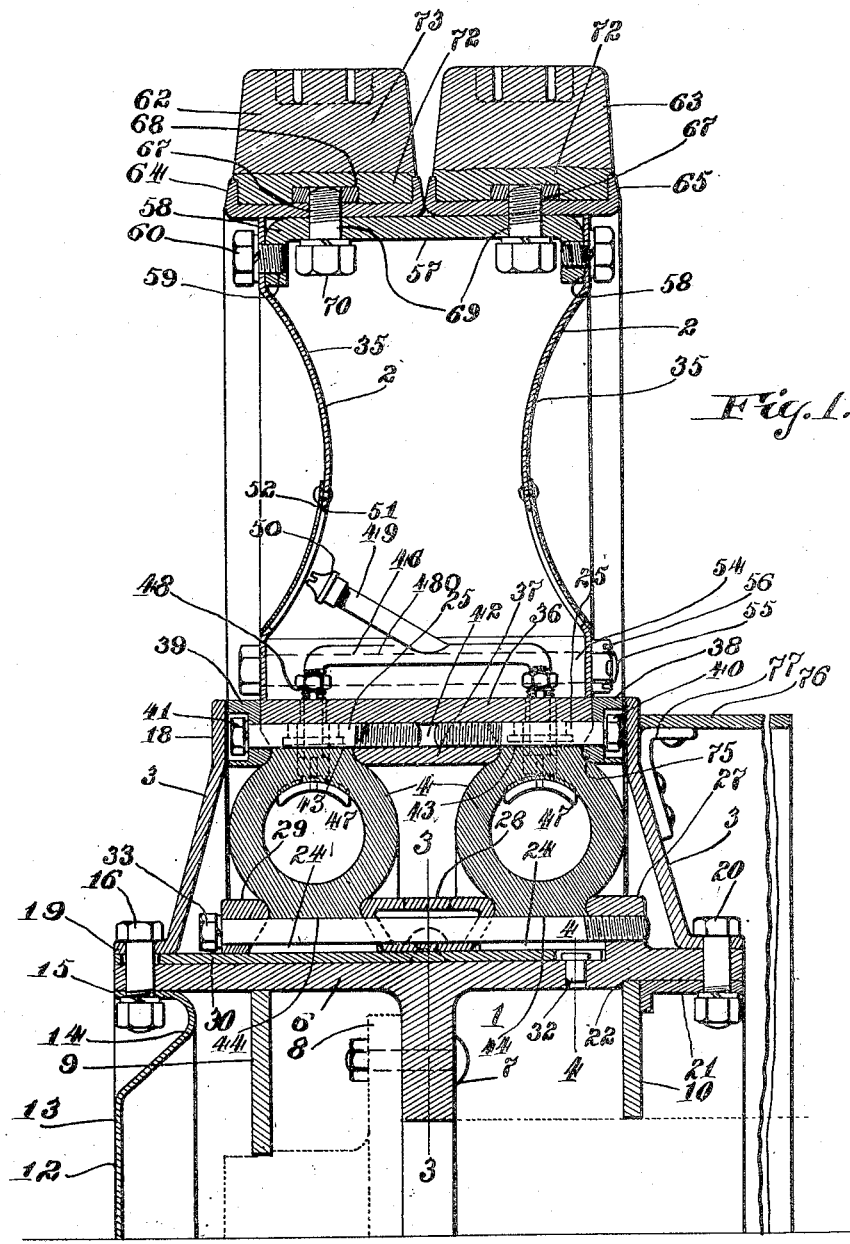

Patented Feb. 3, 1931

1,791,128

UNITED STATES PATENT OFFICE

SCHUYLER C. HATFIELD, OF BALTIMORE, MARYLAND

RESILIENT DISK WHEEL

Application filed June 29, 1922. Serial No. 571,685.

The invention relates to an elastic or resilient disk wheel, the object being to produce such a wheel, of simple and durable construction, possessing sufficient resiliency, so that it may be used to advantage with solid tires and so constructed that it may be easily and conveniently disassembled for the removal and replacement of the pneumatic pads, which provide the resilient element, though these are not subject to excessive wear or frequent failure.

Another feature of the invention is an arrangement of the disks whereby the rim or rims are supported, dispensing with the necessity for a felly and giving a structure of increased lightness on this account.

In the accompanying drawing, I have illustrated a wheel structure employing my invention in the preferred form.

Figure 1, is a section taken on a radial plane including the axis, the lower half of the section below the axis being omitted for convenience of illustration.

Figure 2, is a side elevation, i. e. an elevation at right angles to the plane of Fig. 1, the lower half of the wheel being omitted a portion of the figure being broken away, the outer surface being removed and the underlying parts being shown in section.

Figure 3, is a fragmentary section on the line 3—3 of Figure 1 on a plane at right angles to the axis.

Figure 4, is a section on the line 4—4 of Figure 1, likewise at right angles to the axis.

Figure 5, is a fragmentary side elevation of one of the pneumatic pads.

Referring to the drawings by numerals, the structure shown consists of a central or hub section 1, and an outer annular spoke disk section 2, encircling the hub section and spaced therefrom to provide for relative motion in a radial direction. Means are provided shown in the form of guide plates 3, for confining the relative motion to a radial plane, and, between the sections are pneumatic pads which lend resiliency to the relative motion as hereinafter described.

More particularly the hub section or member consists of an annular casting 6 also referred to herein as an inner hub casing, which in the form of the invention shown is intended for application to an ordinary hub, encircles the hub proper and is provided with an inwardly projecting flange 7, adapted to bear on and be secured to the hub flange 8. I have also shown annular supporting plates or rings 9 and 10, which bear on the hub and against the inner face of the hub member 6, serving to support it on the hub. The outer end of the hub member 6, is closed by means of a hub cap 12, which may be of any suitable design. In the present instance, the central portion of the cap is flat as at 13, and the peripheral portion is formed in a reverse curve 14, forming an edge flange 15 at right angles to the plane portion 13, which flange fits inside the hub member 6, being held by radial bolts 16, passing through the edge of the hub member 6, and also holding the guide plates 3.

These guide plates as shown are of flat frusto-conical form having a flat peripheral portion or flange 18, at the outer edge at right angles to the axis and an inner cylindrical flange 19, parallel to the axis which is received over the end or edge of the hub member 6, being held by the aforesaid radial bolts 16. The foregoing description applies to guide plates 3—3 on both sides, the two being precisely similar except that the back or inner plate 3, is held by radial bolts 20, which also hold the innerlocking ring 21, which holds the supporting plate 10, against a shoulder 22, within the hub member, 6.

The annular or hub member 6 is encircled by a cushioning means shown in the form of pneumatic pads or inner tires 4 as shown, and preferably there are two such pads though the cushioning means is capable of considerable variation within the scope of the invention. Each pad is in the form of a single tube tire of comparatively heavy construction each having an inner and outer peripheral bead 24 and 25 respectively. These pads are secured to the hub member 6, by the combined effect of a circular rib 27, formed integral with the hub member near the inner or back face and just within the inner guide plate 3, and another circular rib or ridge 28, and a ring 29. Rib 28, is when in place centrally disposed as to the hub. It is secured to a sleeve 30, which slides onto and off of the hub casing from the left as seen in Figure 1, i. e. from the outside being positioned in the direction of the circumference by means of pins 32, in the hub casing near the back end thereof, the heads of which occupy slots 34 in the edge of the sleeve. This sleeve is also held by the aforesaid radial bolts 16, the sleeve 30, being between the flange 19, of the outer guide plate and the hub casing proper 6. The ring or rib 29, aforesaid is removable i. e. it slides on and off of the sleeve 30, being held by bolts 33, which as shown are eight in number.

The spoke disk section 2, comprises preferably concave annular plates or disks 35, secured as to their inner peripheries to an inner ring member 36, to which the outer peripheral beads 25, of the pneumatic pads 4, are secured. The beads 25, are held by means of a central rib or ridge 37, projecting from the inner surface of the ring 36, this rib 37, is centrally placed, and when the pads are in place it is between the beads 25. Cooperating with the central rib 37, are two removable rings 38, and 39, on the back and front axial end edges of the ring member 36. These rings are held in place by two series of bolts 40 and 41, the former holding the back ring 38 and the latter, holding the front ring 39. These are passed inward parallel to the axis of the wheel through the rings 38 and 39, into the rib 37, in which they are seated in suitable threaded holes 42. These bolts are also passed through notches 43, in the edge of the outer peripheral beads 25, the bolts 40 and 41, being as is apparent inserted from the back and front sides respectively of the ring member 36.

The inner peripheral beads 24, of the pneumatic pads are also notched at 44, and the beads are held in position by the aforesaid bolts 33, which pass through the removable ring 29, the central ring or rib 28, into the stationary rib 27, on the back side of the hub and through the said notches 44, in the beads 24.

The pneumatic pads 4, may be inflated simultaneously by a valve arrangement shown consisting of a U shaped tube 46, of which the legs extend through the ring member 36, into the inside chamber 47, of each respective pneumatic pad by means of suitable connections 48. The cross arm 480, of the U also has a suitable branch tube connection 49, in the form of a valve stem leading toward the outside disk. This valve stem or tube is provided with a suitable tire valve not shown and if desired has a cap 50, the same being accessible by way of an opening 51, in the disk closed by the swinging cover 52.

The inner ring member 36, is provided with spaced lugs 54, which are apertured to receive bolts 55, by means of which the disks are secured at their inner edges to ring member 36. The inner edges of the disks rest on the opposite ends of the lugs, bolts 55, being preferably entered from the outside and passed through both disks, the inner disk being held by nuts 56.

At their outer peripheries, the disks are spaced and supported by U shaped lugs 57, which as shown are 12 in number. The cross arm of each U shaped lug extends across the wheel from disk to disk the legs 58 of each U, see Figure 1, underlie the outer peripheral edge portions of the plates or disks 35, and each is provided preferably with a threaded aperture 59. The edges of the disks are correspondingly apertured and short bolts or cap screws 60, are passed through the respective disks from the outside of each disk, the screws being seated in the threaded apertures 59, in the lugs and turned up tight against the outer surfaces of the disks or plates holding them rigidly in the relative position in which they are shown.

The wheel illustrated is provided with two tires 62 and 63, cooperating with two rims 64 and 65. These rims 64 and 65, are seated directly on the lugs 57, and secured thereto, whereby the necessity for a felly is dispensed with. In the form of the invention shown, the rims are provided with centrally placed threaded holes 67, spaced to correspond to the spacing of the lugs 57, and the rims may be bossed up about the holes as illustrated at 68, to provide an increased threaded surface. The lugs are correspondingly apertured at 69, and the rims are secured by means of threaded bolts 70, extending outward radially through the holes 69, and engaging the threaded apertures 67, in the rims. The tires 62 and 63, are formed in and vulcanized to the rims preferably consisting of a hard base portion 72, and a more resilient body and tread portion 73, vulcanized thereto. When the tires are worn they may be replaced, or they may be rehabilitated by vulcanizing a new body and tread portion onto the base portion 72. The tire and rim structure shown is practically desirable in that the rims and tires are easily and conveniently removed by removing the bolts 70, making it possible to replace them on the road if necessary and doing away with the prevailing system of replacing solid tires to which forcing the rims onto the wheels by hydraulic pressure is an incident.

Another advantage of the structure described relates to the manner of inflating and equalizing the air pressure within the pads. The double U connection, 48, with the single valve connection, 49, leading to both pads makes it impossible to inflate either pad separately from the other. The connection between the air chambers, in the two pads also keeps the pressure equal and in case of failure of either, the other pad is immediately deflated, making it impossible to run with the entire weight on one pad either on account of slight loss of pressure from the other pad, or on account of failure of either pad as by puncturing or the like, otherwise, it might be impossible to induce truck drivers or other employees in charge to maintain the inflation of the two pads sufficiently equal to prevent throwing the wheel out of true and destruction of the pads due to the inequality of the support furnished by the two respective pads.

It will be observed that the entire structure described and shown is demountable and separable without the use of special tools, all of the parts being capable of being secured by means of bolts, also the fitting parts slide over each other, none of them are forced together by heavy pressure or brazed or welded.

The manner of securing the disks to each other by means of the lugs 57, and the inner rim 36, and the bolts 55, and 60, as well as the manner of securing the tires and rims to the lugs has been fully described. It is evident that all of these parts can be very easily taken down and reassembled if necessary to replace any part that has failed.

To insert the pneumatic pads, the outer spoke disk member which has just been described being separate from the hub casing 6, the outer guide plate 3, having been removed and the valve stems having been disconnected, the pneumatic pad 4, at the right in Figure 1, known as the back or inside pad is first inserted in the inner ring 36, being pressed against the center rib 37. The bead holding ring 38, is then placed on the ring 36, with its edge rib 75, bearing on the reduced portion of the bead 25, of the pneumatic pad, all of which beads have a taper which causes their width to increase outwardly from the center. The bolts, 40, are then inserted drawing the ring, 38, against the bead and applying a considerable pressure to it so that it locks tightly in position, it being understood that the rib 37, has a taper corresponding to the taper of the tire or pad bead. It will also be understood that the bolts pass through the notches, 43, in the beads, 25. The sleeve 30, with rib 28, is next inserted within the right hand pad 4, the left hand pad being previously passed over it, or now inserted. The ring 39, is now placed and secured by bolts 41. The outer portion of the wheel including sleeve 30, is now passed over the hub member and the left hand pad is secured by placing ring 29, and inserting and tightening bolts 33. The inner or back guide plate, 3, has remained in position on the hub casing and it should be further understood that this may be secured to the brake drum, 76, by any suitable means as the brackets and rivets, 77, illustrated. The guide plate, 3, on the left is now replaced, the hub cap, 15, being likewise placed in position by the radial bolts 16, passed through the guide plates, sleeve 30 and the hub member 6, and the flange on the cap which completes the assembly of the wheel.

I have thus described specifically and in detail an elastic wheel embodying the features of my invention in the preferred form in order that the nature and operation of same may be clearly understood by those skilled in the art, however, these specific terms herein are used descriptive rather than in a limiting sense, the scope of the invention being defined in the claims.

What I claim and desire to secure by Letters Patent is:

1. An elastic wheel consisting of an outer annular member having an inner ring forming its inner periphery, a central abutment within said ring, a hub member to be encircled by said annular member spaced inward therefrom to provide for relative motion in a radial plane, a plurality of pneumatic pads between the hub member and the outer annular member, said pads each having an inner and outer peripheral bead, a sleeve encircling the hub member and having a central abutment thereon, an abutment encircling the hub member near one end beyond the sleeve, which latter is adapted to slide onto and off of the hub member at the end opposite the said abutment, a ring encircling the sleeve at the end opposite the abutment, and a series of bolts extending parallel to the axis through said latter ring, through the inner beads of the tires, through the central abutment on the sleeve and into the end abutment, the beads being placed one between the ring and the central abutment and the other between the central abutment and the end abutment respectively, the bolts serving to draw the end ring onto the sleeve, and to draw the sleeve and central abutment toward the end abutment securing the pads to the sleeve and hub, and the outer beads being secured to the annular member, said securing means consisting of a ring at each side and a series of bolts passed inward through each ring from each side and seated in the central abutment of the annular member, and the outer beads of the tire being held between said respective rings and the said central abutment.

2. An elastic wheel having an outer annular member, an inner ring forming the inner periphery of said annular member, a hub member encircled by and spaced inward from said outer member, said ring having a central abutment on its inner face, a sleeve encircling the hub member and having a central abutment on its outer face, pneumatic pads between the sections having inner and outer beads on each side of said respective abutments, a stationary abutment on the hub member near one end, the sleeve being adapted to slide on and off at the opposite end of the hub member, a ring encircling the sleeve near the end opposite said stationary abutment, the inner beads being held between said ring and the central abutment and between said stationary abutment and the central abutment and bolts extending through said ring and central abutment and beads and seated in said stationary abutment serving to draw the ring and the sleeve with the abutment thereon toward the stationary abutment pressing the beads between said members, a ring on each side of the inner ring member of the outer annular member, and bolts seated in the central abutment of said member and passing through the outer beads on the pads and through the said rings at each side whereby the rings are drawn against the beads holding the pads in position, guide plates at each side having cylindrical flanges secured to the hub member and bearing at their peripheries on the rings at each side of the outer annular member.

3. An elastic wheel having an outer annular member, an inner hub member spaced therefrom to provide relative play in the direction of the radii, cushioning means comprising a pneumatic pad between the said members, a sleeve encircling the hub member and removably secured thereto, and carrying the pad so that the latter may be removed and inserted from and in one direction with the sleeve, means for positioning the sleeve consisting of pins projecting from the hub member, cooperating with slots which are provided for that purpose in the sleeve member, and other means for securing the sleeve to the hub member consisting of radial bolts passing through the sleeve and through the hub member at one end thereof, a flanged guide plate and a cover plate also secured by said bolts.

Signed by me at Baltimore, Maryland, this 26th day of June, 1922.

SCHUYLER C. HATFIELD.